United States Patent [19]

McKinzie et al.

[11] 4,181,593
[45] Jan. 1, 1980

[54] MODIFIED TITANIUM DIOXIDE PHOTOACTIVE ELECTRODES

[75] Inventors: Howard McKinzie, Framingham; Elizabeth A. Trickett, Acton, both of Mass.

[73] Assignee: GTE Laboratories Incorporated, Waltham, Mass.

[21] Appl. No.: 918,018

[22] Filed: Jun. 22, 1978

[51] Int. Cl.² .................. C25B 11/10; C25B 11/04
[52] U.S. Cl. .................. 204/290 F; 429/111; 427/74; 427/126
[58] Field of Search .............. 427/111, 74, 126; 204/290 F

[56] References Cited

U.S. PATENT DOCUMENTS

| | | | |
|---|---|---|---|
| 3,259,558 | 7/1966 | Hagiwara | 148/63 |
| 3,681,133 | 8/1972 | Dantro | 427/74 |
| 3,948,751 | 4/1976 | Bianchi | 204/290 F |
| 3,975,557 | 8/1976 | Kuchek | 204/290 F |
| 4,003,817 | 1/1977 | Bianchi | 204/290 F |
| 4,025,669 | 5/1977 | Greenstan | 427/123 |
| 4,040,918 | 8/1977 | Johnson | 204/290 F |
| 4,070,504 | 1/1978 | Bianchi | 204/290 F |
| 4,086,157 | 4/1978 | Koziol | 204/290 F |

OTHER PUBLICATIONS

Augustynski, *J. Electrochemical Soc.* vol. 124, No. 7 (7-1977) *Novel . . . Water* pp. 1063-1064.
Kennedy, *J. Electrochem. Soc.* vol. 125 (5-1978) No. 5, *Photo-oxidation . . . Electrodes,* pp. 709-714.
Kennedy, *J. Electrochem. Soc.,* vol. 125, No. 5 (5-1978). *Flatband . . . Plot,* pp. 723-726.
Haneman, *J. Electrochemical Soc.,* vol. 124, No. 6 (6-1977) *Electrochemical . . . $Fe_2O_3$* pp. 861-862.

*Primary Examiner*—Michael F. Esposito
*Attorney, Agent, or Firm*—Jerry F. Janssen

[57] ABSTRACT

Photoactive titanium dioxide based semiconductor electrodes utilizable in photoassisted oxidation reactions in an electrochemical cell comprise thin films of polycrystalline titanium dioxide modified with one or more materials consisting of oxides of aluminum or of a d-electron transition metal other than titanium. Oxides in which the metal is in a chemical oxidation state other than +4, which possess some solid state solubility in titanium dioxide, and an impurity energy level band lying within the energy band gap of titanium dioxide function effectively as modifiers.

The electrode comprises a uniform film of titanium dioxide mixed with up to 50 mole percent of the modifier sintered to a suitable metal body. In an alternative embodiment of the invention, the electrode comprises a film of titanium dioxide sintered to a titanium metal body with the modifier distributed throughout the titanium dioxide film with a concentration gradient having a minimum next to the surface of the metal body.

2 Claims, 3 Drawing Figures

MODIFIED TITANIUM DIOXIDE PHOTOACTIVE ELECTRODES

CROSS-REFERENCE TO RELATED APPLICATIONS

This application contains subject matter related to subject matter disclosed in the following copending applications, both of which are filed concurrently herewith and assigned to the assignee of the present application.

Application Ser. No. 918,000 filed June 22, 1978 in the names of Howard McKinzie and Elizabeth A. Trickett entitled "An Improved $TiO_2$ Electrode for Photoelectrolysis."

Application Ser. No. 918,017 filed June 22, 1978 in the name of Elizabeth A. Trickett entitled "Method of Preparing Photoactive $TiO_2$-Coated Thin Film Electrodes."

BACKGROUND OF THE INVENTION

This invention relates to photoactive semiconductor electrodes. More particularly, it is concerned with photoactive p- and n-type semiconductor electrodes utilizable in electrochemical cells and in photoassisted electrochemical oxidation reactions utilizing titanium dioxide as a component of the photoactive electrode material.

There has been considerable recent interest in the application of photoactive semiconductor electrodes to the electrolysis of water and to the direct conversion of solar to electrical or chemical energy. The uses of such electrodes have recently been generalized to reduction-oxidation reactions in addition to the electrolysis of water. Oxidation reactions at n-type photoactive semiconductor electrodes and reduction reactions at p-type electrodes can be carried out at potentials much lower than ordinarily required using light as the driving force for the reactions. Such processes have been termed "photoassisted" rather than photocatalyzed reactions.

It is known that electrodes fabricated from single crystals of pure titanium dioxide, doped single crystals of titanium dioxide, or polycrystalline titanium dioxide deposited on an appropriate substrate can be used as photoelectrodes. Titanium dioxide normally has high electrical resistivity. To form electrically conductive, semiconductor material the titanium dioxide is typically treated by reduction with hydrogen. It is theorized that such treatment produces a material with oxygen lattice deficiencies in the titanium dioxide crystal with the lattice defect sites contributing to the semiconductor properties. This partially reduced material can be characterized by the general formula $TiO_{(2-x)}$, where x takes on a value between zero and one. These partially reduced phases of titanium dioxide are called Magneli phases of $TiO_2$.

Because of the great possibilities which these electrodes have for the conversion of light to electrical or chemical energy, a number of studies have been directed to methods of fabricating electrodes which make such conversions more efficient. In previously described uses of n-type titanium dioxide semiconductor electrodes, it has generally been the practice to use electrodes formed of single crystals of $TiO_2$ or of polycrystalline $TiO_2$, reduced to the Magneli phases.

The technique of producing single crystal photoactive $TiO_2$ electrodes is described, for example, by S. N. Frank et al. in "Semiconductor Electrodes 11. Electrochemistry at n-Type $TiO_2$ Electrodes in Acetonitrile Solutions," *J. Am. Chem. Soc.*, 97:7427 (1975). Polycrystalline titanium dioxide electrodes produced by chemical vapor deposition techniques are treated by K. L. Hardee et al. in "The Chemical Vapor Deposition and Application of Polycrystalline n-Type Titanium Dioxide Electrodes to the Photosensitized Electrolysis of Water," *J. Electrochem. Soc.*, 122:739 (1975).

Single crystal $TiO_2$ electrodes or doped single crystal $TiO_2$ electrodes are often costly and difficult to produce. On the other hand, polycrystalline electrodes which utilize Magneli phase $TiO_2$ as the photoactive semiconductor material are less difficult and costly to produce, but are limited in their spectral response to wavelengths of light shorter than about 450 nanometers.

It is therefore an object of the present invention to provide doped or modified polycrystalline titanium dioxide p- and n-type semiconductor electrodes which are simple and inexpensive to produce and which are photoactive at wavelengths of light longer than 450 nanometers.

BRIEF SUMMARY OF THE INVENTION

Photoactive p- and n-type semiconductor electrodes in accordance with the present invention are utilizable in photochemical cells and photoassisted electrochemical oxidation reactions. These electrodes respond to wavelengths of light longer than 450 nanometers, are easily fabricated, and do not require a reduction step with hydrogen or other reducing gas in their fabrication. Electrodes according to the present invention comprise a polycrystalline thin film of a mixture of titanium dioxide and at least one metal oxide of a metal selected from the group consisting of aluminum and the d-electron transition metals other than titanium, the film being sintered to a suitable metal substrate. The metal of the doping or modifying metal oxide is in a chemical oxidation state other than $+4$.

In one embodiment of the invention, the electrodes comprise a thin film of a uniform coprecipitated polycrystalline mixture of titanium dioxide and up to 50 mole percent of the modifying oxide.

In an alternative embodiment of the invention, the electrodes comprise a thin film of titanium dioxide on a titanium metal body with the doping or modifying metal oxide distributed through the titanium dioxide with a concentration gradient having a minimum next to the surface of the titanium body and a maximum at the film surface.

For a better understanding of the present invention, together with other and further objects, advantages and capabilities thereof, reference is made to the following disclosure and appended claims in connection with the above-described drawings.

DETAILED DESCRIPTION

P- or N-type titanium dioxide semiconductor electrodes according to the present invention provide improved photochemical response and efficiency by incorporating into the titanium dioxide one or more dopants or modifiers comprising oxides of metals selected from the group consisting of aluminum and the d-electron transition metals other than titanium. (As used throughout this specification and claims, the term "d-electron transition metal" means any metallic element of families 1b, 2b, 3b, 4b, 5b, 6b, 7b or 8 of the Periodic Table of the Elements as it appears on page B-3 of the 53rd Edition of the *Handbook of Chemistry and Physics*, Chemical Rubber Publishing Co., Cleveland, Ohio, 1972, including lanthanum and actinium, but excluding elements of the so-called "inner transition" lanthanide and actinide series.)

It has been found that the mode of incorporation of the oxide modifier into the titanium dioxide can be that of simply forming a uniform, finely divided mixture of titanium dioxide and up to 50 mole percent of the modifier. Alternatively, the finely divided oxide modifier is applied to a titanium body which is then heated to form a layer of titanium dioxide on the surface of the titanium body. The $TiO_2$ film thus formed contains the modifying oxide in a concentration gradient which varies from a minimum near the surface of the titanium metal body to a maximum near the surface of the mixed oxide film. Electrodes of the present invention avoid the cost and difficulties encountered in fabricating doped single crystal electrodes while functioning as efficiently. A surprising and unexpected property of electrodes according to the present invention is that they function effectively even though in some cases there is apparently only a physical mixture of the titanium dioxide and modifier.

Incorporation of the oxide modifier into the titanium dioxide crystal lattice, to the extent that such incorporation occurs, may be substitutional or interstitial. If the metal ions of the oxide so incorporated are in a chemical oxidation state other than +4, one or more of the surrounding titanium ions must assume an oxidation state other than its normal +4 state in the crystal lattice in order to preserve electrical charge neutrality. This adjustment of charge within the crystal results in lattice defect sites which provide the p- or n-type semiconductor activity.

Figure 1:
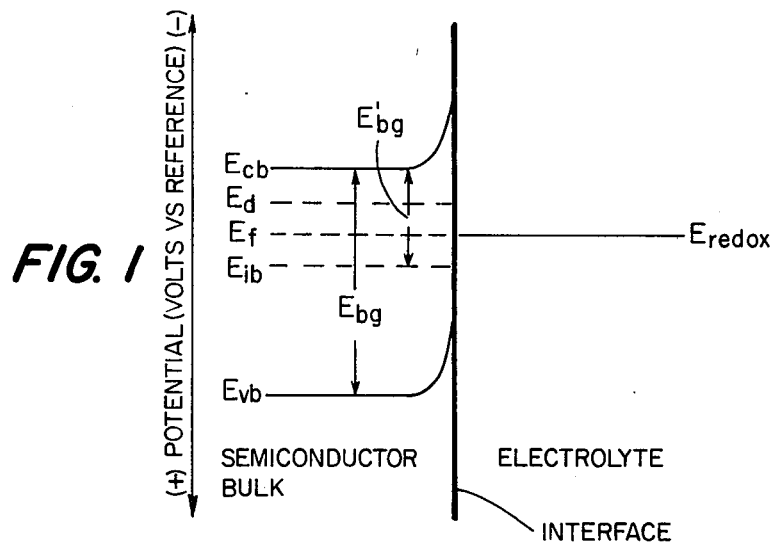
FIG. 1 is a schematic representation of the energy levels within a doped or modified semiconductor electrode at the interface between the electrode and the electrolyte solution in which the electrode is immersed.

The energy level relationships at the interface between a semiconductor electrode and the electrolyte solution in which it is immersed are shown schematically in FIG. 1. Energy levels of the electrode shown there, expressed in volts measured against a reference are $E_f$, the Fermi level, and $E_{cb}$ and $E_{vb}$, the lowest lying energy level of the conduction band and the highest lying level of the valence band of the semiconductor, respectively. The energy band gap of the semiconductor is represented by $E_{bg}$.

Absorption of light by the semiconductor of an energy corresponding to $E_{bg}$ results in the promotion of an electron from the valence band to the conduction band and subsequent separation of electron/electron hole pairs. In n-type titanium dioxide, the energy band gap is normally 3.06 electron volts corresponding to a light absorption edge of about 450 nanometers wavelength. In the modified polycrystalline titanium dioxide electrodes of the present invention, this absorption edge is shifted 40–70 nanometers toward longer wavelengths thus making more efficient use of the light spectrum.

Photogenerated electrons promoted to the conduction band migrate freely through the semiconductor bulk, while the corresponding electron holes migrate to the surface of the electrode. Band bending at and near the surface of the semiconductor causes the electron holes to assume a final potential equal to that of $E_{vb}$ at the electrode/electrolyte interface. If the reduction-oxidation potential, $E_{redox}$, of the electrolyte solvent or of some solute species is more negative than $E_{vb}$, interfacial electron transfer can occur to fill the electron holes, simultaneously oxidizing the solvent or solute species. Oxidation of the semiconductor material itself may also occur if the potential for anodic dissolution, $E_d$, of the material is more negative than $E_{vb}$. Whether oxidation of some electrolyte species or of the semiconductor material itself is the predominating reaction at the illuminated electrode depends upon the relative surface rates of the two reactions.

If $E_d$ is more negative than $E_{redox}$, then the oxidized form of the electrolyte species, once formed by the photoassisted oxidation reaction, is capable of oxidizing the semiconductor material and the electrode surface may be corroded. The choice of modifying oxide is thus governed in part by the relative values of $E_d$ for the material and $E_{redox}$ for the oxidation reaction in which the modified titanium dioxide electrode is to be employed.

Suitable modifiers or dopants must also possess an energy level band (impurity band) lying within the band gap of titanium dioxide. In FIG. 1, the dopant impurity band is designated $E_{ib}$. This impurity band effectively lowers the bottom edge of the conduction band in addition to serving as a source of electrons which can be photopromoted to the conduction band with an energy requirement equal to the modified band gap $E'_{bg}$. The creation of holes is effected by the promotion of electrons from the valence band $E_{vb}$ to the impurity band, $E_{ib}$. The energy requirement for this latter promotion is lower than that in the undoped material and corresponds to the minimum energy required to drive the reaction. It has been found that titanium dioxide electrodes according to the present invention absorb light of wavelength 40–70 nanometers further into the long wavelength region of the light spectrum than undoped polycrystalline electrodes of the prior art.

Dopant or modifier materials which have been found to be effective in producing photoactive, p- or n-type semiconductor titanium dioxide electrodes according to the present invention possess some solid state solubility in titanium dioxide, and an impurity band lying within the energy band gap of titanium dioxide. Oxides of metals selected from the group consisting of aluminum and the d-electron transition metals other than titanium in which oxides the metal is in a chemical oxidation state other than +4 have been found to be effective. When electrodes according to the present invention are to be used in photoassisted oxidation reactions in a given solvent system, additionally desirable, but not necessary, properties of the dopant oxide include low solubility in the solvent and an anodic dissolution potential $E_d$ more positive than that of $E_{redox}$ for the solvent.

DESCRIPTION OF THE PREFERRED EMBODIMENTS

In one embodiment of the invention the electrodes comprise a thin film of a uniform mixture of titanium dioxide and the oxide of one or more metals selected from the group consisting of aluminum and the d-electron transition metals other than titanium. A simple but surprisingly effective method of fabricating electrodes according to this embodiment is disclosed and claimed in copending application Ser. No. 918,001 filed concurrently herewith in the names of Howard McKinzie and Elizabeth A. Trickett entitled "Method of Preparing Modified Titanium Dioxide Photoactive Electrodes" assigned to the assignee of the present invention.

Figure 2:
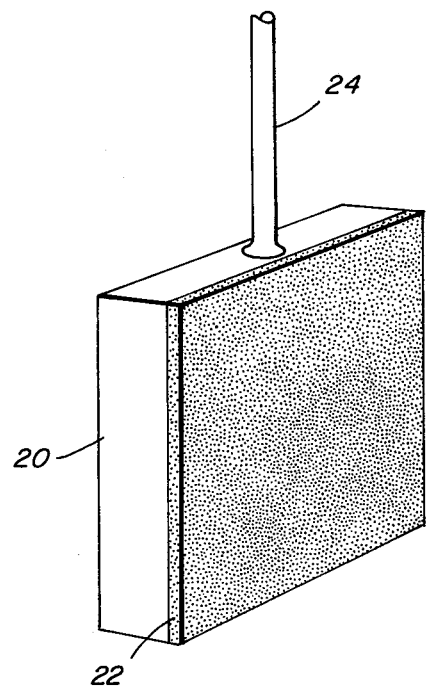
FIG. 2 is a representation of an electrode according to the present invention.

The method is detailed in Examples I–V below, but briefly stated comprises the steps of (1) forming a slurry of a uniform, coprecipitated mixture of titanium dioxide and the oxide modifier in a volatile solvent, (2) applying the slurry to a suitable metal substrate, and (3) heating the coated metal body to sinter the applied coating to the metal body. As shown in FIG. 2, electrodes according to this embodiment of the invention comprise the metal body 20 and the sintered coating of mixed oxides 22. An electrical connector 24 permits connection of the electrode to an external electrical circuit. The connector can be a wire which is spot welded or silver epoxy welded to the metal body or, alternatively, may form a part of the shaped metal body itself.

In another embodiment of the invention, the electrodes of this invention comprise a titanium metal body to the surface of which is sintered a coating of titanium dioxide containing the oxide modifier in a concentration gradient having a minimum at or near the surface of the titanium metal body and a maximum at or near the surface of the electrode coating. The method of fabricating electrodes according to this embodiment is disclosed and claimed in copending application Ser. No. 918,002 filed concurrently herewith in the names of Howard McKinzie and Elizabeth A. Trickett entitled "In Situ Method of Preparing Modified Titanium Dioxide Photoactive Electrodes" assigned to the assignee of the present invention.

Figure 3:
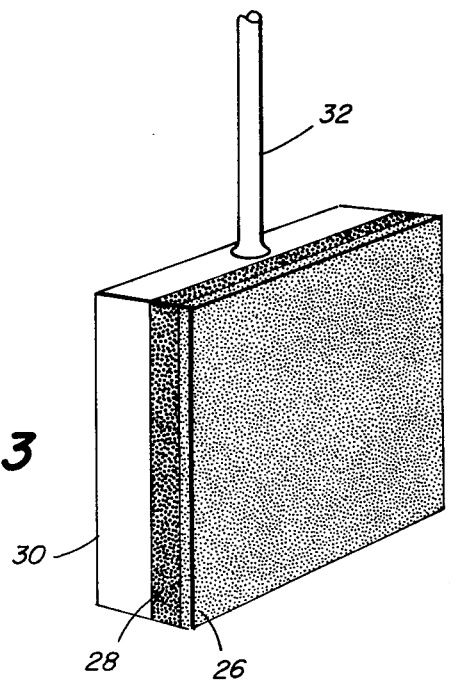
FIG. 3 is a representation of an electrode according to an alternative embodiment of the present invention.

The method is detailed in Examples VI–IX below, but briefly stated comprises the steps of (1) forming a slurry of an oxide modifier comprising one or more oxides of metals selected from the group consisting of aluminum and the d-electron transition metals other than titanium, (2) applying the slurry to the surface of a titanium metal body, and (3) heating the coated body in an oxygen-containing atmosphere to form a layer of titanium dioxide on the titanium metal body, with the layer being mixed with the previously applied film of oxide modifier during formation of the layer. As shown in FIG. 3, electrodes according to this embodiment of the invention comprise a titanium body 30 to which is applied a thin film of the oxide modifier 26. As a result of the heating in an oxygen-containing atmosphere, a layer of titanium dioxide 28 forms on the titanium body 30. Although there is shown in FIG. 3 a clear line of demarcation between the layer of titanium dioxide 28 and the applied film of oxide modifier 26, the oxide modifier is distributed through the titanium dioxide with a uniform concentration gradient having a minimum at or near the surface of the titanium body and a maximum at or near the surface of the electrode coating. This gradient results from diffusion of the oxide modifier into the growing film of titanium dioxide during the heating step.

In the first embodiment described above, the metal body may be formed of any metal such as titanium, stainless steel, Monel metal, platinum, etc. which does not corrode in electrolyte solutions in which the electrode is employed.

The following examples are provided to allow one skilled in the art to practice the invention, and should not be viewed as limiting the scope of the invention but merely illustrative thereof.

EXAMPLES

In each of the following Examples, photoactive semiconductor titanium dioxide electrodes were produced by painting a coating of electrode material on a 1 cm × 1 cm piece of 5 mil (0.13 mm) thick metal foil. The foil pieces were cleaned and etched in each case by immersing for two minutes in a bath comprising 50 parts by weight water, one part hydrogen peroxide, and one part concentrated hydrofluoric acid. Following immersion in the etching bath, the foil pieces were rinsed free of acid and air dried.

The electrode coating materials were prepared by methods detailed in each of the Examples. The dry electrode coating powders were slurried in sufficient aqueous acetone in each case to produce a mixture of a consistency which could be painted on the metal body with a brush. It was found that the amounts of solvent and coating material used in each Example to form the slurry were not critical as long as a slurry of easily spread consistency was obtained. Other techniques for applying the slurry well known to the art such as dipping, flow-coating, etc. can also be used.

The coated foil pieces were then heated in air at a temperature between 500° C. and 800° C. for a period of up to eight hours. In all of the following Examples, except Examples V and VII, the coated electrodes were further subjected to heating in a hydrogen atmosphere at a temperature between 400° C. and 1000° C. for a period of up to three hours. It is theorized that this reduction step serves to improve the internal electrical conductivity of the electrode coating films, however, it is not an absolutely necessary step in the fabrication of electrodes according to the present invention. It is an advantage of electrodes of this invention that such a reduction step is not necessary to produce photoactive properties.

Following the heat treatment steps, fabrication of each electrode was completed by attaching a platinum wire to the coated foil piece. A small region of the electrode coating was removed to reveal the bare metal substrate. A platinum wire was silver epoxy welded to the electrode and the weld joint was covered with silicon rubber.

The photoelectrochemical properties of the electrode prepared in each Example were evaluated by measuring the current flow through a cell employing the electrode. The cell in each case consisted of the photoactive electrode, a standard calomel reference electrode, and a platinum counter electrode of 2 cm$^2$ surface area. The electrolyte solution in each Example was either 1 normal aqueous sodium chloride solution or 1 normal aqueous sodium hydroxide solution. Various voltages were impressed across the cell as measured between the experimental electrode and the calomel reference electrode. The current flow between the photoactive electrode and the platinum counter electrode at each voltage was measured. These data appear in the following Table.

The electrical measurements were made while the photoelectrode of each Example was illuminated by light from a 150 watt Model VIX-150 lamp (Eimac Division, Varian Associates, 301 Independence Way, Palo Alto, CA 94070). The light passed through a water-filled tube with quartz endplates to remove infrared wavelengths, and then through a quartz lens to concentrate the light on the photoactive electrode. Measurement indicated that under these conditions, approximately 200 milliwatts of radiant energy of wavelengths less than 400 nanometers were striking the electrode.

EXAMPLE I

The active electrode coating material consisted of a 1:24 molar ratio mixture of tungstic oxide ($WO_3$) and titanium dioxide ($TiO_2$), respectively. To prepare the mixture, 15.6 g (0.390 mole) of sodium hydroxide were dissolved in one liter of water. Tungstic oxide (2.32 g, 0.01 mole) was added with stirring until a clear solution was obtained. Titanium dioxide (19.2 g, 0.24 mole) was added to the aqueous tungstate solution with rapid stirring to maintain the titanium dioxide in suspension. To the rapidly stirred mixture was rapidly added 30 milliliters of concentrated hydrochloric acid, followed immediately by a second 30 milliliter portion. The coprecipitate of tungstic oxide and titanium dioxide which formed was collected after centrifuging the mixture and decanting the supernate. The residue was washed free of acid with successive rinses with demineralized water, and air dried in an oven at 105° C.

It has been found that a coprecipitated mixture of molybdenum oxide and titanium dioxide serves also as an effective photoactive semiconductor electrode coating material. The mixture can be formed by coprecipitation of molybdenum oxide from aqueous alkaline molybdate solutions together with suspended titanium dioxide in a manner analogous to the method just described for tungstic oxide. The steps of forming the coprecipitated mixture and subsequently, of the finished electrode are the same as those given for the tungstic oxide-titanium dioxide system.

The method of electrode fabrication, including the steps of painting, heat treatment in air at 750° C. for eight hours, and reduction in hydrogen at 900° C. for three hours, and attachment of the platinum wire lead are those detailed above.

The currents generated by the illuminated electrodes at various values of applied potential are given in the accompanying Table.

EXAMPLE II

In this Example, the electrode coating material consisted of a 1:12 molar ratio mixture of aluminum oxide ($Al_2O_3$) and titanium dioxide ($TiO_2$). A mixture of finely divided aluminum oxide (1.02 g, 0.01 mole) and finely divided titanium dioxide (9.59 g, 0.12 mole) was thoroughly shaken. A portion of the dry mixture was taken up in aqueous acetone to form a slurry which was painted on titanium foil. This foil piece was then fabricated into an electrode and evaluated by the processes described above. The current flows generated by this electrode at various values of applied voltage under illumination appear in the accompanying Table.

EXAMPLE III

In this Example, the electrode coating material was a 1:12 molar ratio mixture of lanthanum cobaltate ($La_2O_3.Co_2O_3$) and titanium dioxide ($TiO_2$). The lanthanum cobaltate was prepared by the method detailed in U.S. Pat. No. 3,931,393 issued to Frank C. Palilla and assigned to the assignee of the present invention. A mixture of 2.46 g (0.01 mole) of finely divided lanthanum cobaltate and 9.59 g (0.12 mole) of titanium dioxide was thoroughly mixed by shaking. A portion of this dry mixture was taken up in acetone and the resulting slurry was painted on titanium foil. The coated foil piece was fabricated into an electrode and evaluated by the processes described above in Example I. The current flows generated by this electrode under illumination at various values of applied voltage appear in the accompanying Table.

EXAMPLE IV

In Example IV, the electrode coating material consisted of a 1:1:24 molar ratio mixture of aluminum oxide, tungstic oxide, and titanium dioxide, respectively. To prepare the mixture, 1.02 g (0.01 mole) of aluminum oxide were mixed by thorough shaking with 19.432 g of the 1:24 mixture of tungstic oxide and titanium dioxide prepared in Example I. This mixture was slurried in aqueous acetone and painted on titanium foil. The coated foil piece was fabricated into an electrode using the process described above. The electrode was evaluated in a cell utilizing 1 normal sodium hydroxide as the electrolyte solution. The currents generated by the electrode at various values of applied voltage appear in the accompanying Table.

EXAMPLE V

In this Example, the electrode coating material consisted of a 1:24 molar ratio mixture of tungstic oxide and titanium dioxide prepared as described above in Example I. The electrode preparation was similar to that described above in Example I with the exception that in this Example, the reduction step in hydrogen gas was omitted.

The procedure for evaluating the photoelectrochemical properties of this electrode was the same as described above. The currents generated at various values of applied voltage are given in the accompanying Table.

EXAMPLE VI

A slurry of silver oxide in aqueous acetone was used to paint the surface of a piece of titanium foil. The coated foil was heated in air at 750° C. for eight hours and then in hydrogen gas at 900° C. for three hours. The photoelectrochemical properties of this electrode were determined by the process described above. The current flow generated by this electrode under illumination at various values of applied voltage appear in the accompanying Table.

EXAMPLE VII

A slurry of tungstic oxide ($WO_3$) in aqueous acetone was used to paint the surface of a piece of titanium foil. The coated foil was heated in air at 500° C. for eight hours. The photoelectrochemical properties of this electrode were determined by the process detailed above. The current flow generated by this electrode under illumination at various values of applied voltage appear in the accompanying Table.

This electrode was further evaluated by measuring the current flow at various impressed voltages with the light illuminating the electrode having passed through a variable wavelength monochromator. Current flow through the cell was observed with electrode illumination having wavelengths as high as 520 nanometers.

EXAMPLE VIII

A slurry of tungstic oxide ($WO_3$) in aqueous acetone was used to paint the surface of a piece of titanium foil. The coated foil was heated in air at 500° C. for five hours, and then in hydrogen at 900° C. for three hours. The photoelectrochemical properties of this electrode were determined as detailed above. The current flow generated by this electrode under illumination at various values of applied voltage appear in the accompanying Table.

EXAMPLE IX

A slurry of vanadium pentoxide ($V_2O_5$) in aqueous acetone was used to paint the surface of a piece of titanium foil. The coated foil piece was heated in air at 500° C. for eight hours, and then in hydrogen at 400° C. for three hours. The photoelectrochemical properties of this electrode were determined as detailed above. The current flow generated by this electrode under illumination at various values of applied potential appear in the accompanying Table.

TABLE

| EX. | ELECTRODE COATING | OPEN CIRCUIT POTENTIAL (VOLTS) | CURRENT FLOW IN MILLIAMPERES AT THE GIVEN POTENTIAL | | | | | | | | | | | | | |
|---|---|---|---|---|---|---|---|---|---|---|---|---|---|---|---|---|
| | | | −0.8 V | −0.6 V | −0.4 V | −0.2 V | 0.0 V | +0.2 V | +0.4 V | +0.6 V | +0.8 V | +1.0 V | +1.2 V | +1.4 V | +1.6 V | +1.8 V |
| I | 1:24 $WO_3$:$TiO_2$ (reduced) | −0.445 | | | | | 4.4 | 7.2 | 8.8 | | | | | | | |
| II | 1:12 $Al_2O_3$:$TiO_2$ (reduced) | −0.426 | | | | | 6.8 | 13.6 | 16.0 | | | | | | | |
| III | 1:12 $LaCoO_3$:$TiO_2$ (reduced) | −0.421 | | | | | 4.8 | 10.8 | 14.0 | 15.0 | | | | | | |
| IV | 1:1:24 $Al_2O_3$:$WO_3$:$TiO_2$ (reduced) | −0.908 | 2.8 | 13.6 | 16.4 | 17.4 | 17.6 | 17.8 | | | | | | | | |
| V | 1:24 $WO_3$:$TiO_2$ (unreduced) | −0.421 | | | | 1.0 | 4.0 | 7.4 | 9.4 | 10.8 | | | | | | |
| VI | $Ag_2O$ on Ti (reduced) | −0.173 | | | | | 0.8 | 16.8 | 18.8 | | | | | | | |
| VII | $WO_3$ on Ti (unreduced) | −0.302 | | | | | | 2.4 | 7.5 | 12.4 | 14.8 | | | | | |
| VIII | $WO_3$ on Ti (reduced) | −0.361 | | | | | | 0.8 | 6.8 | 14.8 | | | | | | |
| IX | $V_2O_5$ on Ti (reduced) | +0.229 | | | | | | | | | | 0.2 | 0.7 | 1.5 | 2.2 | 3.0 | 3.8 |

The open circuit voltages shown in the accompanying Table are for the electrode and cell system described in each Example above as measured with the experimental electrode under illumination. Examination of the data in the Table shows that the current generated by the illuminated electrode increased in each case with increasing applied potential, with higher current values obtained in those Examples where the electrolyte solution was sodium hydroxide.

While there has been shown and described what is believed at present to constitute the preferred embodiments of the present invention, it will be obvious to those skilled in the art that various changes and modifications may be made therein without departing from the scope of the invention as defined by the appended claims.

What is claimed is:

1. A photoactive semiconductor electrode utilizable in photoelectrochemical cells and photoassisted oxidation reactions consisting of:
   a titanium metal body, a film of photoactive n-type semiconductor material on the surface of said body,
   said semiconductor material consisting essentially of polycrystalline titanium dioxide and at least one oxide of a metal selected from the group consisting of the d-electron transition metals other than titanium, said metal being in a chemical oxidation state other than +4,
   the metal oxide being distributed throughout the titanium dioxide with a uniform concentration gradient having a minimum at the surface of the titanium body and a maximum at the surface of said film.

2. The electrode according to claim 1 wherein said metal oxide is selected from the group consisting of cobalt oxide, lanthanum oxide, molybdenum oxide, silver oxide, tungstic oxide, vanadium pentoxide, and mixtures thereof.

* * * * *